(12) United States Patent
Luo et al.

(10) Patent No.: US 10,285,411 B2
(45) Date of Patent: May 14, 2019

(54) SYSTEM FOR CLEANING FRESH AND FRESH-CUT PRODUCE

(71) Applicants: The United States of America, as represented by the Secretary of Agriculture, Washington, DC (US); The Board of Trustees of the University of Illinois, Urbana, IL (US)

(72) Inventors: Yaguang Luo, Bethesda, MD (US); Bin Zhou, Laurel, MD (US); Patricia D. Millner, Burtonsville, MD (US); Arne J. Pearlstein, Urbana, IL (US)

(73) Assignees: The United States of America, as represented by The Secretary of Agriculture, Washington, DC (US); The Board of Trustees of The University of Illinois, Urbana, IL (US)

(*) Notice: Subject to any disclaimer, the term of this patent is extended or adjusted under 35 U.S.C. 154(b) by 45 days.

(21) Appl. No.: 15/417,570

(22) Filed: Jan. 27, 2017

(65) Prior Publication Data
US 2017/0215443 A1    Aug. 3, 2017

Related U.S. Application Data

(60) Provisional application No. 62/287,964, filed on Jan. 28, 2016.

(51) Int. Cl.
*A23B 7/144* (2006.01)
*A23B 7/16* (2006.01)
(Continued)

(52) U.S. Cl.
CPC .............. *A23B 7/144* (2013.01); *A23B 7/157* (2013.01); *A23B 7/158* (2013.01); *A23B 7/16* (2013.01); *A23N 12/02* (2013.01); *A23N 12/06* (2013.01)

(58) Field of Classification Search
None
See application file for complete search history.

(56) References Cited

U.S. PATENT DOCUMENTS

1,931,463 A * 10/1933 Brogden ................ A23N 12/02
134/68
6,626,192 B2    9/2003 Garcia, Jr. et al.
(Continued)

FOREIGN PATENT DOCUMENTS

CN    103880010 A    6/2014
JP    3058532    10/1998
(Continued)

OTHER PUBLICATIONS

English Translation of KR20090010072, accessed on Jul. 2018. (Year: 2009).*

*Primary Examiner* — Eric W Golightly
*Assistant Examiner* — Arlyn I Rivera-Cordero
(74) *Attorney, Agent, or Firm* — John D. Fado; Robert D. Jones

(57) ABSTRACT

The system for cleaning fresh and freshly-cut produce is designed to clean produce as soon as practicable after the produce is cut. As the produce falls downwardly, a spray manifold directs a produce-washing liquid upwardly so that the produce-washing liquid directly sprays and impacts the falling produce. The impact of the produce-washing liquid causes the produce to tumble and the descent of the produce is slowed, and consequently the produce is thoroughly coated and cleaned by the produce-washing liquid. In an alternative embodiment, a suspending fluid (preferably air) is simultaneously directed to the falling produce to slow the descent of the produce and further ensure that the produce is thoroughly washed and directly sprayed by the produce-washing liquid.

14 Claims, 7 Drawing Sheets

(51) Int. Cl.
  *A23B 7/157* (2006.01)
  *A23B 7/158* (2006.01)
  *A23N 12/02* (2006.01)
  *A23N 12/06* (2006.01)

(56) References Cited

U.S. PATENT DOCUMENTS

| | | |
|---|---|---|
| 8,646,470 B2 | 2/2014 | Bajema et al. |
| 9,326,543 B2 | 5/2016 | McEntire, Jr. et al. |
| 2006/0237044 A1 | 10/2006 | Ferguson et al. |
| 2007/0056610 A1 | 3/2007 | Lee et al. |

FOREIGN PATENT DOCUMENTS

| | | | | |
|---|---|---|---|---|
| KR | 20090010072 | * | 10/2009 | ............. A23N 12/02 |
| KR | 2004492760000 | | 10/2009 | |

* cited by examiner

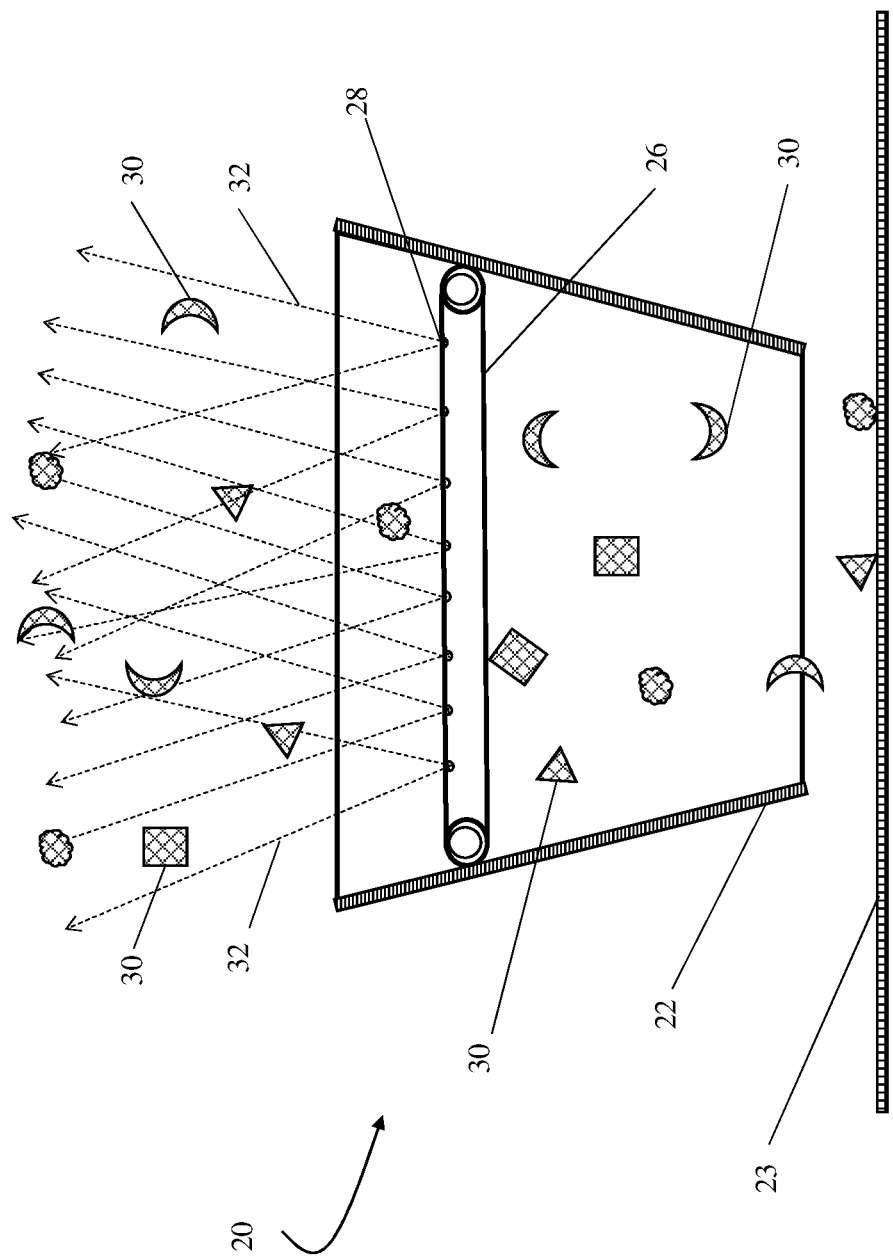
FIG.2.A.

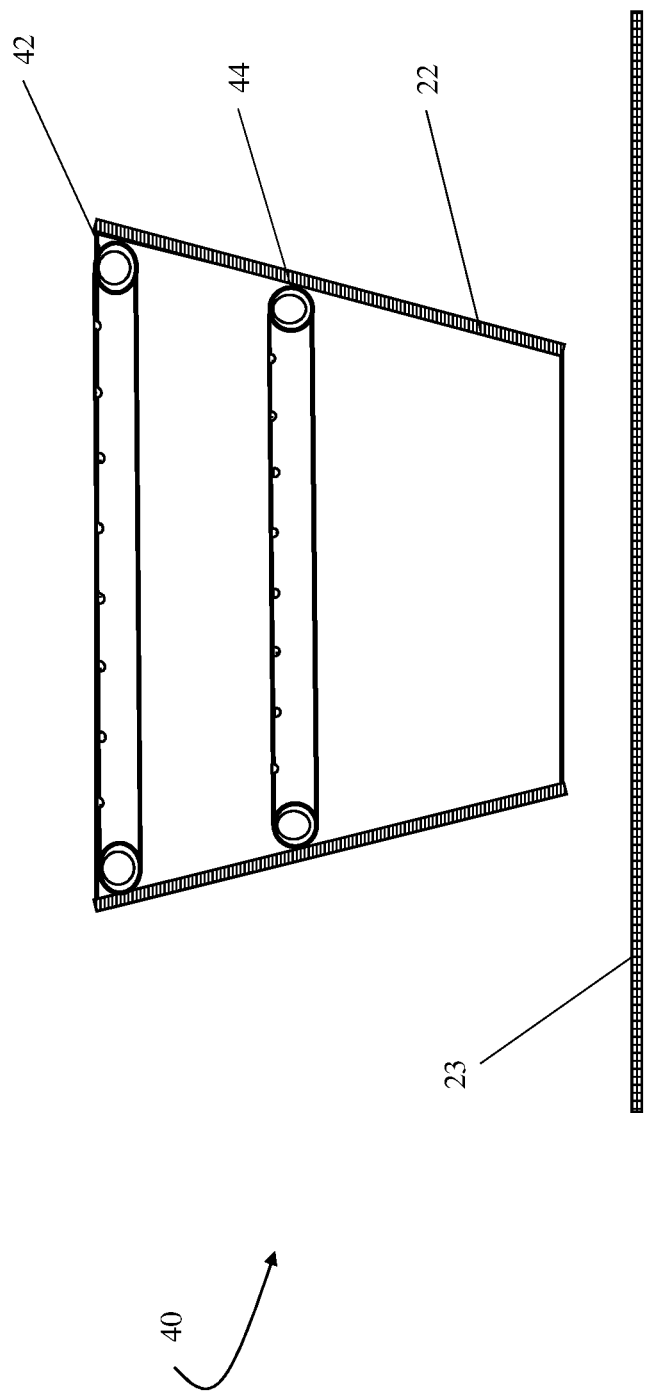
FIG. 2.B.

SYSTEM FOR CLEANING FRESH AND FRESH-CUT PRODUCE

REFERENCE TO RELATED APPLICATIONS

This application claims the benefit of U.S. Provisional Application No. 62/287,964 filed Jan. 28, 2016, which is incorporated herein by reference in its entirety.

FIELD OF THE INVENTION

The disclosed method and apparatus relate to a process for washing whole fresh and fresh-cut produce so that the produce organic exudate is removed and segregated from the produce as soon as practicable after cutting the produce, and foreign materials and microorganisms are removed/inactivated. Specifically, the method and apparatus described herein relate to a system for washing produce by directing a spray of a produce-washing liquid onto fresh-cut (or uncut) produce that is falling downwardly. The system is designed so that as the produce falls, it is impacted, reoriented, cleaned, and/or sanitized by the produce-washing liquid.

BACKGROUND OF THE INVENTION

Fresh-cut produce (including bagged salad, baby spinach, shredded, and sliced carrots, shredded lettuce and cabbage, diced and sliced onions, and other cut fruits and vegetables) is an approximately three billion dollar industry. Efficiently cleaning and processing fresh-cut produce is essential to product safety, product quality, and cost management. A significant portion of the cost of processing fresh-cut produce is related to (a) the amount of water used during the process, and (b) the cost of the chemicals (frequently chlorine) mixed with the water to produce a sanitizing liquid.

In current fresh-cut processing, harvested produce is generally cut and then washed to remove organic exudate (such as juices and/or a more viscous pulpy matter) that has leaked from freshly-cut surfaces, as well as field debris and soil particulates. This "organic exudate" reacts immediately and continuously with chlorine and other sanitizers, and consequently reduces the level of active ("free") chlorine and other sanitizers in the washing solution. Free chlorine and other sanitizers can be replenished through the "make-up" addition of chemicals, but the continuing accumulation of organic material in the wash solution requires the addition of ever-larger amounts of sanitizer chemicals in order to maintain an adequate concentration of active sanitizer for sanitizing produce and preventing microbial cross-contamination.

When adequate sanitizer concentration is not maintained above a critical level, not only is the efficacy of microbial reduction diminished, but also microbial survival in wash water is enhanced, which allows microbial contamination of otherwise clean produce. This then results in significant food safety and food quality problems. Additionally, some by-products from chlorination reactions with organic exudate are known or suspected carcinogens, and the accumulation of large amounts of organic material in the wash water leads to increases in their rates of formation, and to higher residual levels in the final product. The presence of these by-products prompted the European Union to prohibit the use of chlorinated solutions for produce washing. Thus, early and effective removal of organic exudate is critical.

Effective microbial inactivation in fresh-cut produce washing depends on a number of factors, including sanitizer concentration, exposure time of the produce to the washing solution, and the degree of agitation and turbulence experienced by the produce. Sanitizer concentration and exposure time are important because there is a strong relationship between these factors and the desired outcomes, including microbial inactivation and maintenance of product quality.

If the combination of sanitizer concentration and exposure time is insufficient, inadequate microbial inactivation is achieved. On the other hand, if the combination of sanitizer concentration and exposure time is excessive, product damage will occur. Agitation and turbulence are also important because they break up "clumps" of produce and also reduce the thickness of the "stagnant" boundary layer on the produce surface through which the sanitizing agent must penetrate in order to be effective.

In the prior art, washing of fresh-cut produce is typically conducted in either a continuous, semi-batch, or batch process. In continuous processes, fresh-cut produce is either submerged in a washing solution that flows through a flume, or resides on a moving belt that is subjected to a sprayed washing solution. In the former case, the mean exposure time of the produce to the washing solution is given by the volume of the flume divided by the volumetric flow rate through the flume. In the latter case, the exposure time of each piece of produce is given by the length of the moving belt, divided by the linear velocity of the belt.

For spray washing on a belt, attempts to increase the exposure time require either a wider belt moving more slowly, or a longer belt. Since horizontal space is severely constrained in most of the fresh-cut processing facility in the United States, neither approach is a viable option. U.S. Pat. No. 9,326,543 to McEntire and U.S. Pat. No. 6,626,192 to Garcia disclose (primarily) spray-type systems where produce on a perforated conveyor is sprayed from both above and below the conveyor. Note that, although sprayers disclosed in the prior art are directed upwardly at the bottom of a produce conveyor, the sprayers are not positioned to directly spray produce as it falls downwardly through the air above the conveyor.

For flume washing, attempts to increase the exposure time require either more pieces of equipment, each with less throughput, or equipment with larger dimensions. U.S. Pat. No. 8,646,470 to Bajema is an example of a (primarily) flume type wash system.

Continuous-flume washing has several important limitations. First, to control the cost of water usage and the energy to chill the water, wash water in the flume system is often reused, leading to a significant accumulation of organic exudate along with field debris and soil particulates. The organic constituents react rapidly and chemically with chlorine, thereby reducing the amount of free chlorine. The accumulation of exudate and other contaminants also allows the formation of chlorinated by-products, and makes it difficult to maintain the chlorine concentration at a level sufficient to achieve microbial inactivation.

Second, reuse of process water, especially in the turbulent mixing environment of a large flume, can lead to cross-contamination. Pathogens and other microbial species are spread in the turbulently flowing liquid, and thus further transferred to other pieces of produce. In semi-batch and batch washing, the same tank of sanitizing liquid is typically used to wash many batches of produce, with the potential for considerable cross-contamination.

The need exists for a method to quickly and efficiently remove organic exudate, field debris, and soil particulates from freshly-cut produce while minimizing both the use of chlorine (or other sanitizers) and the volume of water used in the washing process, while (simultaneously) effectively cleaning the produce. In accordance with the current "inflight washing process," immediately after the produce is cut, it is allowed to fall through a produce chute, such that as the produce descends, its fall is retarded by a generally upwardly flow of produce-washing liquid, and/or by a generally upwardly flow of air.

The upward flow of liquid and/or air causes the produce to reorient or tumble as it falls, and also retards the generally downward motion of the produce, thus increasing the exposure time to the liquid. These two factors, singly, or in combination, increase the likelihood that each part of each piece of produce is thoroughly washed and exposed to the sanitizing liquid.

Although the exposure time is relatively short, the reorienting "tumbling" motion of the freshly-cut produce as it falls through an upward flow of liquid and/or air leads to more effective produce sanitization than current industry practices. Further, after the falling produce lands, it can be quickly and effectively separated from the produce-washing liquid, which now includes dissolved and suspended organic exudate, field debris, and soil particulates.

SUMMARY OF THE INVENTION

This disclosure is directed to a system and method for cleaning and sanitizing produce. In accordance with the current system and method, a feeder system is positioned above a produce-washing liquid sprayer. As the produce falls from the feeder system, the produce-washing liquid sprayer directs a spray of produce-washing liquid generally upward, so that as the produce-washing liquid directly sprays and impacts the falling produce, the produce tumbles and descent of the produce is slowed, and consequently the produce is thoroughly coated and cleaned by the produce-washing liquid. In at least one alternative embodiment, an air flow is also directed upwardly to further slow the descent of the produce and thereby increase the tumbling motion of the produce as well as the time that the produce is exposed to the produce-washing liquid.

BRIEF DESCRIPTION OF THE DRAWINGS

FIG. 2.A. is a partial sectional view along the sectional line II shown in FIG. 1.

FIG. 2.B. is a partial sectional view of an alternative embodiment.

FIGS. 3-6 demonstrate, collectively, that the "inflight" invention (described herein) performed more effectively in removing the organic material than the conventional spray with all other conditions held the same (e.g., same amount of produce-washing liquid). Specifically:

FIG. 3 is a diagram showing chlorine demand for produce-washing liquid collected from the conventional spray process, as compared to chlorine demand for produce-washing liquid collected from the "inflight" process described herein.

FIG. 4 is a diagram showing chemical oxygen demand (COD) for produce-washing liquid collected from the conventional spray process, as compared to COD for produce-washing liquid collected from the "inflight" process described herein.

FIG. 5 is a diagram showing absorbance (254 nm) for produce-washing liquid collected from the conventional spray process, as compared to absorbance (254 nm) for produce-washing liquid collected from the "inflight" process described herein.

FIG. 6 is a diagram showing turbidity for produce-washing liquid collected from the conventional spray process, as compared to turbidity for produce-washing liquid water collected from the "inflight" process described herein.

DETAILED DESCRIPTION OF PREFERRED EMBODIMENTS

Figure 1:
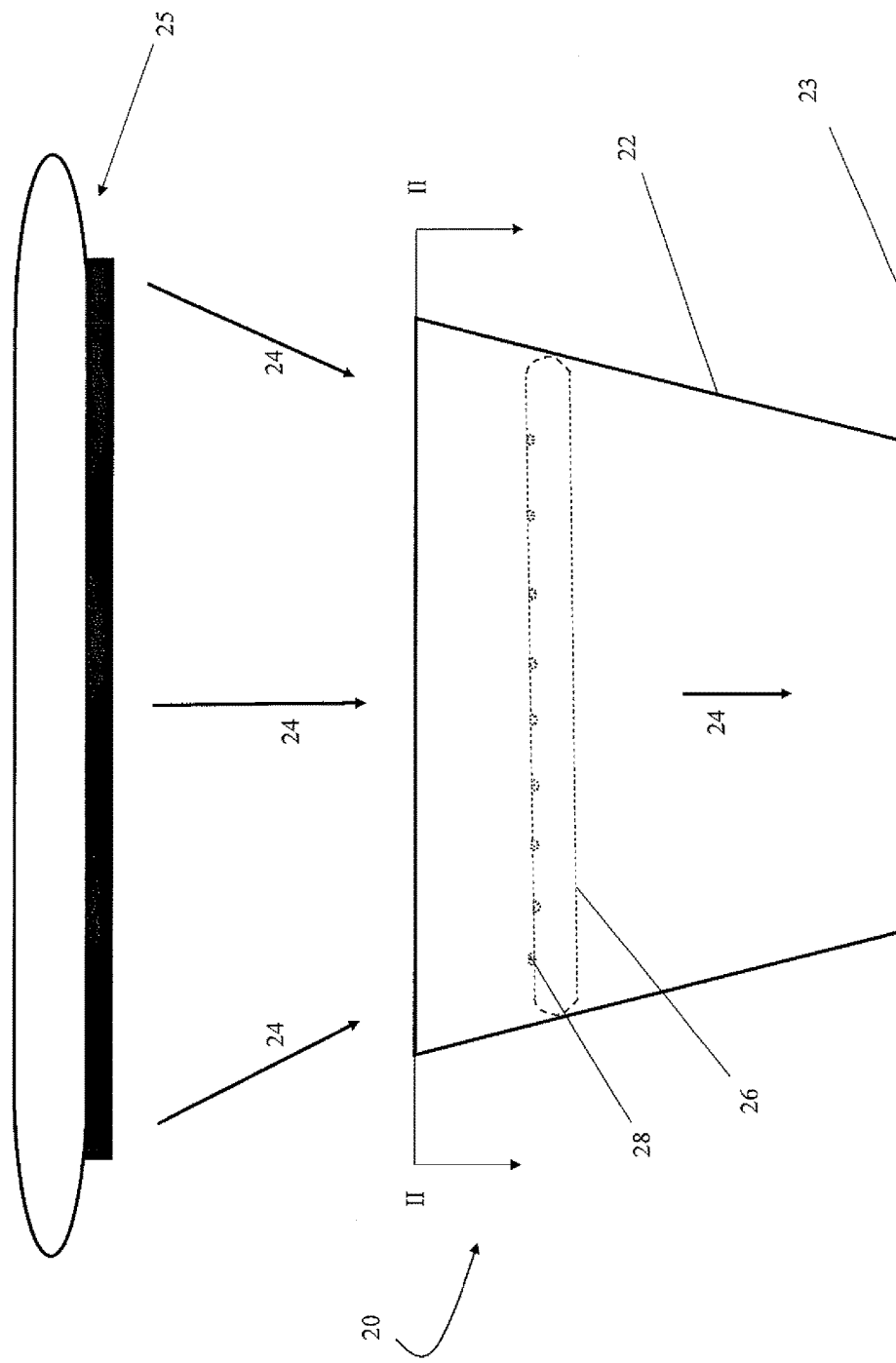
FIG. 1 is a view of the produce chute.
Figure 3:
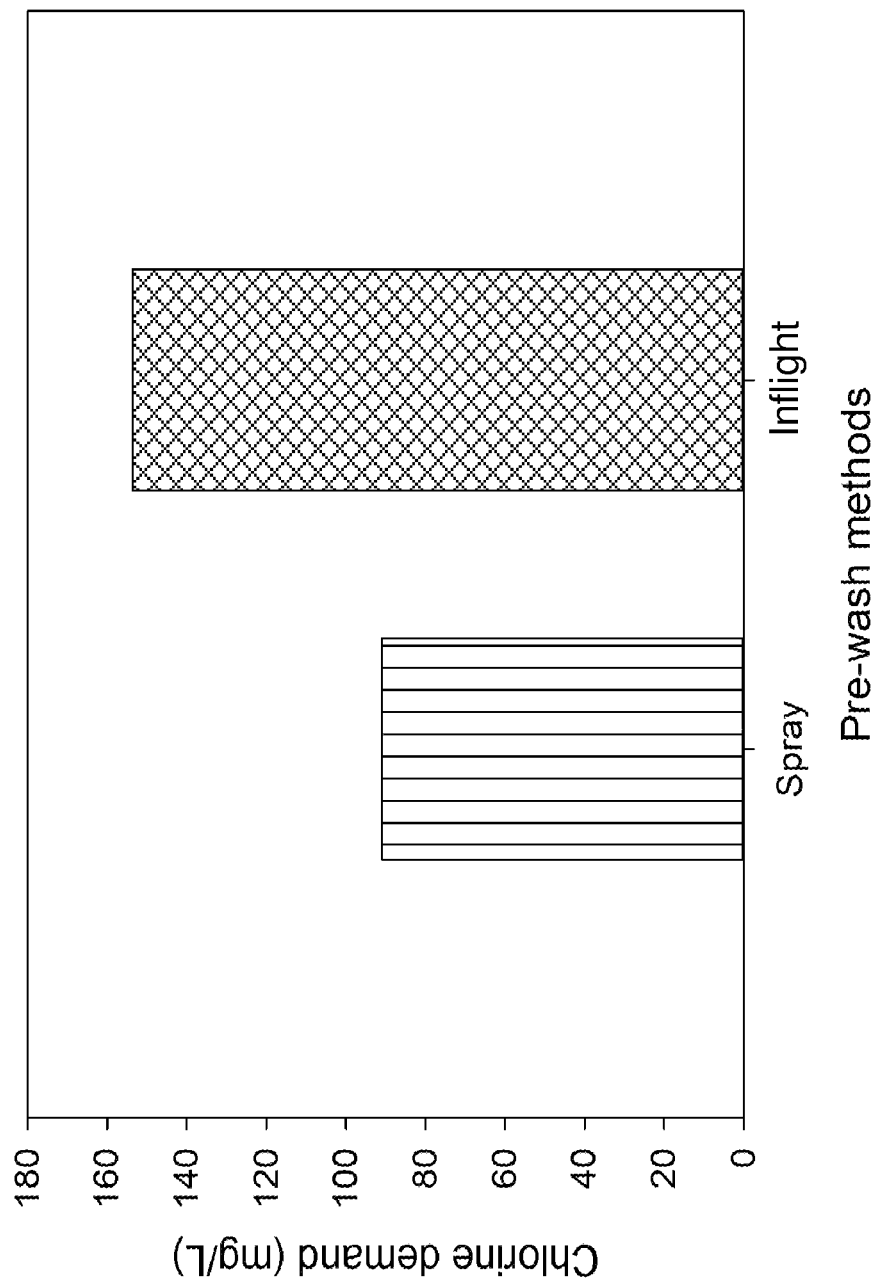
FIGS. 3-6 are graphical representations of test data collected by the inventors. Specifically, the inventors tested produce-washing liquid collected below a perforated conveyor belt typical of conventional overhead produce spray operations (shown as "spray" in FIGS. 3-6), and compared the characteristics of the "spray" produce-washing liquid with the characteristics of the produce-washing liquid collected below the substrate (reference number 23, as shown in FIG. 1) per the method described herein (shown as "inflight" in FIGS. 3-6).
Figure 4:
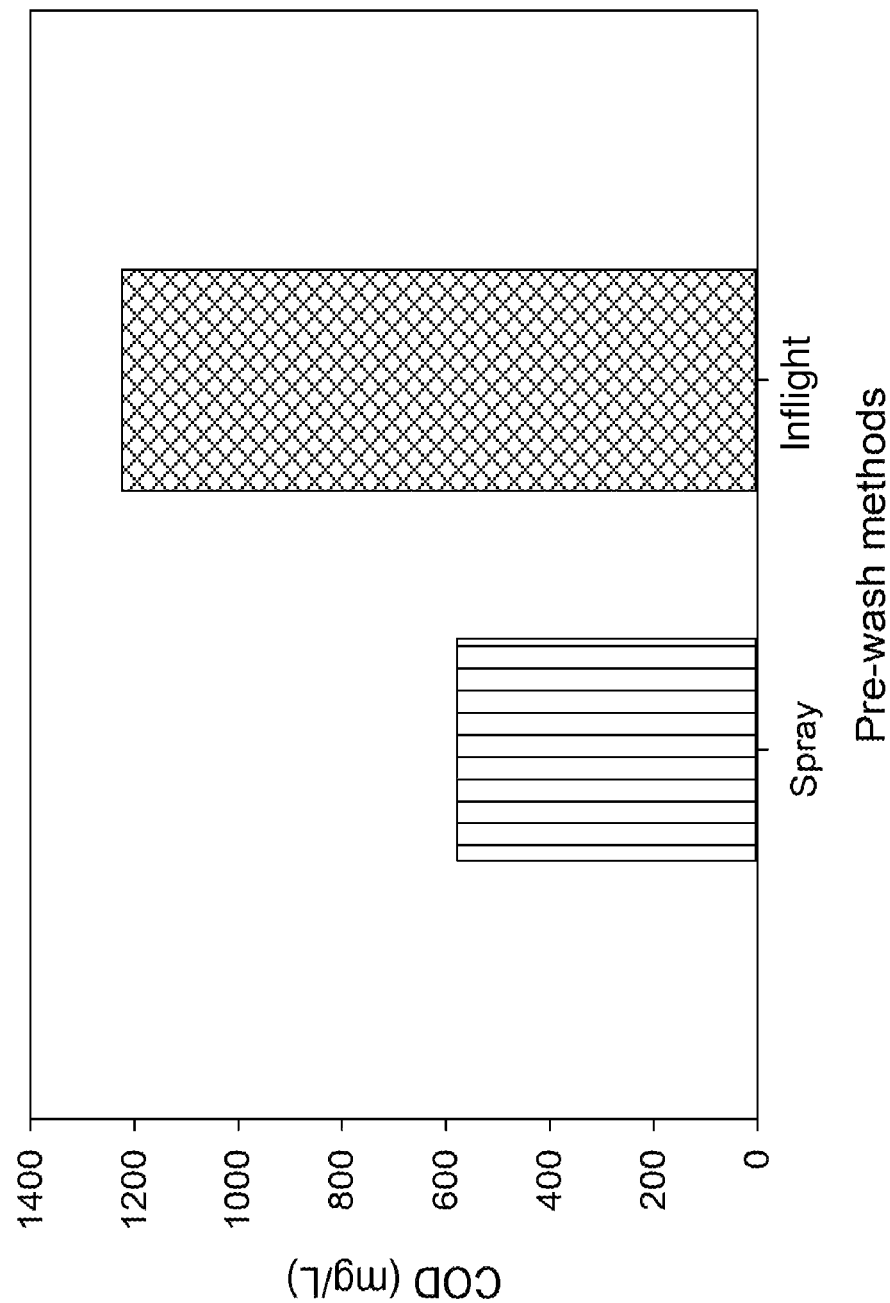
Figure 5:
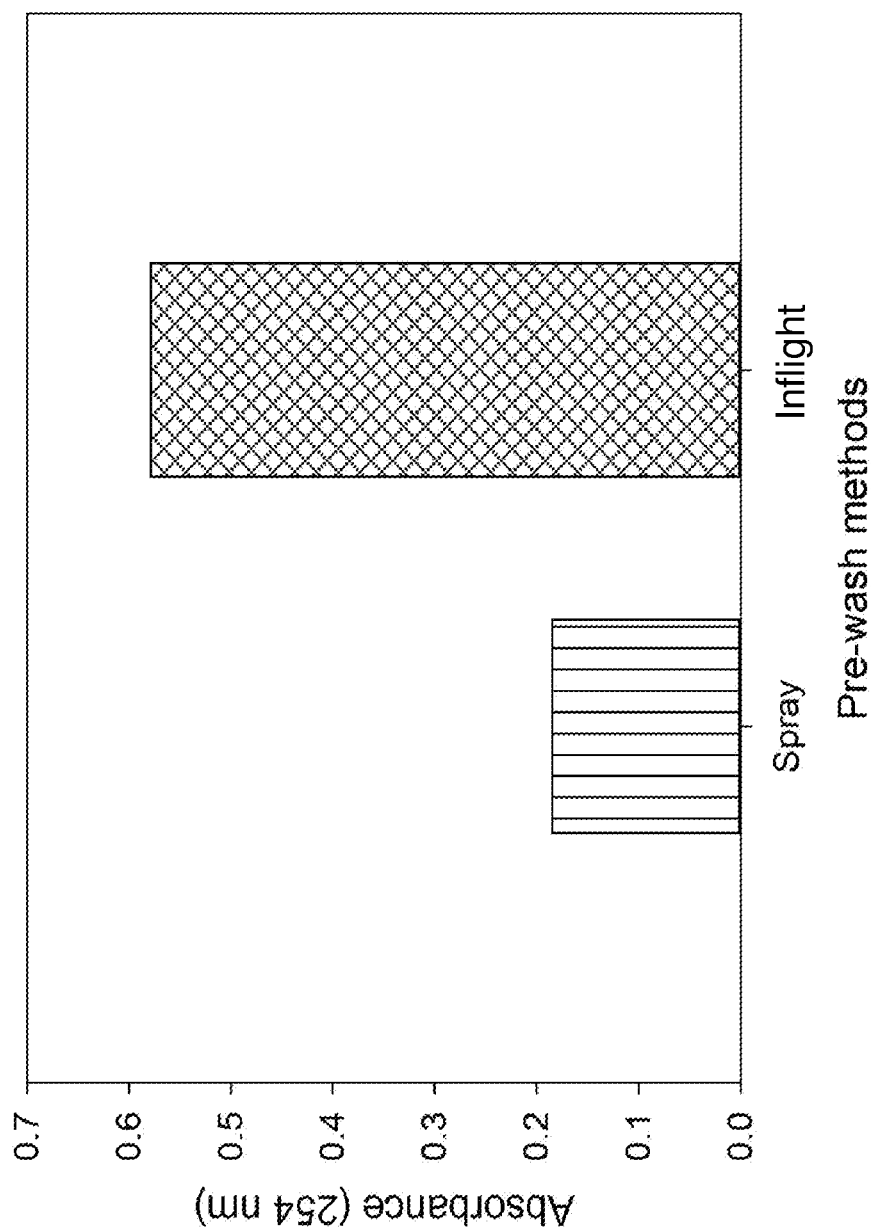
Figure 6:
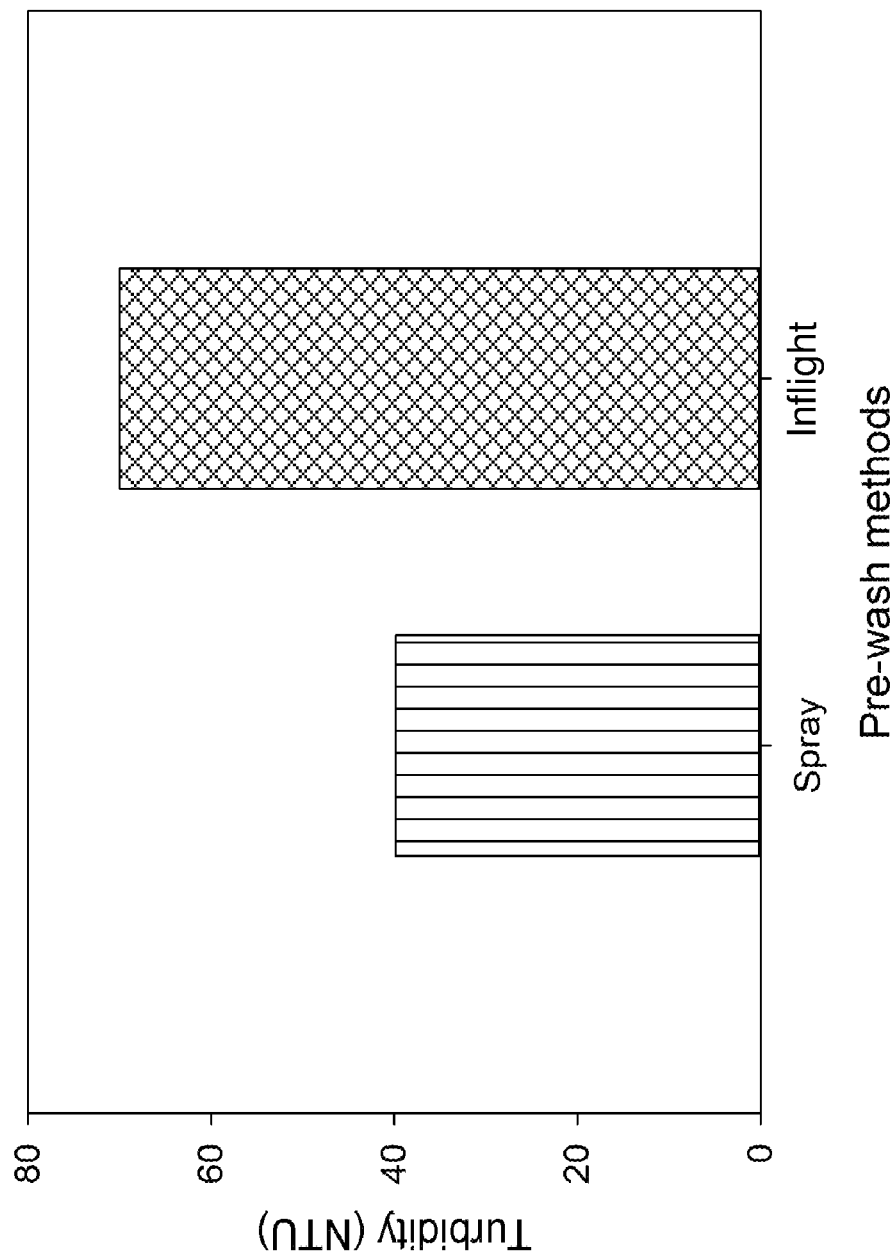

As generally shown in FIG. 1, the method and apparatus described herein comprises an "inflight produce washing system" 20 that is configured to clean produce. The system is described as an "inflight" system because a feeder system renders the produce airborne so that the produce is cleaned as it falls.

As shown in FIGS. 1 and 2A, the inflight produce cleaning system 20 comprises a produce chute 22. The produce chute 22 is designed to generally funnel produce 30 downwardly in the direction of the arrows 24. (Note that, although multiple chunks of cut produce 30, are shown in FIG. 2.A., for simplicity, only a few exemplary chunks 30 are labeled with reference numbers.) A spray manifold 26 is positioned within the produce chute 22. A plurality of upwardly oriented sprayers 28 is arranged on an upper surface of the spray manifold 26. In the preferred embodiment, the sprayers 28 direct a produce-washing liquid generally upwardly (i.e., the produce-washing liquid has an "upward velocity component") so that as the produce falls, the produce-washing liquid directly sprays and cleans the produce. The fall of the produce 30 is ultimately arrested by a substrate 23.

FIG. 2.B. shows an alternative embodiment wherein the modified produce-washing system 40 comprises an upper manifold/apparatus 42 that sprays a suspending fluid (such as air), and a lower manifold/apparatus 44 that sprays produce-washing liquid. The purpose of the upper air spray manifold/apparatus 42 is to provide an air cushion that slows the descent of fresh-cut produce 30 and lengthens the time that the produce-washing liquid is in contact with the produce 30. The upwardly-directed air also further facilitates the tumbling motion of the produce 30 so that the produce 30 is more thoroughly exposed to the produce-washing liquid and is thereby cleaned by the produce-washing liquid.

For the purposes of this disclosure, a "produce-washing liquid" is defined as any liquid used to clean, wash, or sanitize produce. The "produce-washing liquid" may include water either with or without additive chemicals/substances. Some additive chemicals/substances may include chlorinated or ozonated water, (sometimes with a surfactant) and other similar materials intended to clean, sanitize, and/or help process produce.

A "suspending fluid" is defined as upwardly directed air, or other gas, or produce washing liquid, directed to the falling produce, to retard the rate at which the produce falls—primarily for the purpose of causing the produce to tumble and extending the time that the produce is exposed to the produce-washing liquid.

A "feeder system" is defined as any arrangement or assembly that causes produce to fall/become airborne. As shown in FIG. 1, in the preferred embodiment, the feeder system 25 comprises an exit chute of a produce cutter. Although FIG. 1 schematically shows the feeder system 25 as relatively close to the produce chute 22, in the preferred embodiment, there is sufficient separation between the feeder system 25 and the produce chute 22 so that after the produce 30 leaves the feeder system, the outer surface of the produce 30 is coated with produce-washing liquid as the produce 30 falls downwardly toward the produce chute 22 (see FIG. 2.A). Note that the produce chute 22 is "bottomless" so that the produce 30 falls through the chute 22 and lands on the screen 23, as best shown in FIG. 2.A.

A "sprayer" is defined as essentially anything that sprays. The term "sprayer" includes all types of nozzles (including jet nozzles), as well as configurations that only comprise an aperture and may not include a conventional nozzle at all.

A flow with an "upward velocity component" is defined as a generally upward flow that is directed so that the flow is at least 1 degree above horizontal.

"Cleaning the produce/fresh-cut produce/freshly-cut produce" is defined as at least partially removing the field debris, soil particles, and organic exudate from the cleaned item.

"Organic exudate" is defined as the juices and/or a more viscous pulpy matter exuded from cut produce.

"Fresh produce" is defined as fruits and vegetables that are freshly harvested or are still within a few days after harvesting, and have not been cut or subjected to any other form of size reduction.

"Fresh-cut produce" is defined as produce that has recently been removed from a field environment, and has been washed/sanitized, and packaged for direct human consumption. Other items of fresh-cut produce include "minimally processed", lightly processed", and/or "ready-to-eat" produce. Examples may include cut lettuce, shredded carrots, diced onions, and sliced apples. Washed, packaged, and ready-to-eat baby spinach and spring mix are also included in this category, although their preparation does not necessarily involve cutting at the processing plant.

"Freshly-cut produce" is a subset of fresh-cut produce and is defined as produce where the produce item itself is freshly cut into smaller portions.

The term/phrase "directly sprays" means that (for example) produce sprayers are positioned to directly spray the produce—and consequently do not "indirectly" spray the produce through a perforated conveyor belt or through any other intervening obstruction (i.e., the sprayers do not "indirectly spray" the produce). Sprayers "directly spray" produce when their spray is unobstructed by any type of conveyor belt/mechanism or any other object positioned between the sprayer and the produce that deflects or obstructs the spray.

In the preferred embodiment, the produce chute 22 is shaped like a hollow, truncated, and inverted cone. In alternative embodiments, the produce chute 22 may have any form known in the art consistent with accommodating the manifold 26. In further alternative embodiments, the produce chute 22 may be absent completely. Similarly, in the preferred embodiment, the spray sprayers 28 (which may be jet spray nozzles) are configured to impart significant upward velocity to the suspending fluid so that the generally downward motion of the falling produce is significantly retarded and so that the produce "tumbles" as it falls, so as to be thoroughly coated by and exposed to the liquid.

In alternative embodiments, the sprayers 28 (which may be nozzles) are comprised of specifically shaped apertures in the upper portion of the manifold 26 so that the nozzles 28 do not extend above the upper surface of the manifold 26. In further alternative embodiments, some of the nozzles 28 may emit air rather than liquid washing solution so that a combination of air and washing liquid impacts the falling produce 30.

Although FIGS. 1, 2A, and 2B show one or two azimuthal manifolds 26, 42, 44 positioned in a circular, ring-like arrangement near the top of the produce chute 22, in alternative embodiments, there may be multiple manifolds 26, 42, 44, and the manifold(s) may be positioned anywhere on, above, or below the chute 22. Additionally, all manifolds 26, 42, 44 may emit produce-washing liquid, or two (or more) manifolds may emit producing washing liquid and one (or more) manifold may emit a suspending fluid. Further, the manifolds 26, 42, 44 may be noncircular and instead, may have any shape known in the art and may (or may not) be positioned on the boundary of the produce chute. In addition to being positioned horizontally (as shown in FIGS. 1, 2A, and 2B), the manifold(s) may be oriented in any direction, including vertically.

FIG. 2.B. is described (above) as being configured so that suspending fluid is sprayed from the upper sprayer/manifold 42 near the top of the produce chute 22, and the produce cleaning liquid is sprayed from the lower sprayer/manifold 44 positioned lower in the produce chute 22. However, in alternative embodiments, the configuration may be reversed so that the produce-washing liquid is sprayed from the upper manifold 42, and suspending fluid is sprayed from the lower manifold 44.

Further, in the preferred embodiment, the substrate 23 is comprised of a mesh, grate, or other filtering material that allows liquids (such as water, sanitizing liquid, including dissolved and suspended organic exudate, field debris, and soil particulates) to drain through the substrate 23 material and separate from the produce 30. The substrate 23 may be a portion of a conveyor assembly or other mechanism associated with processing freshly-cut produce.

As best shown in FIG. 1 and FIG. 2.A., in operation, produce 30 is expelled from a feeder assembly 25. As the produce 30 falls through the air in the direction of the arrows 24, nozzles 28 directly spray produce-washing liquid which impacts the freshly-cut produce 30, thereby causing the produce 30 to tumble in a generally downward motion. As the produce 30 continues to fall, the produce 30 is ultimately funneled downwardly by a bottomless produce chute 22, and onto a porous substrate 23 where the produce-washing liquid (including any liquid now comprising dissolved and suspended organic exudate and field debris) drains away from (and is segregated from) the freshly-cut produce 30.

As shown in FIG. 2.B., in an alternative embodiment, a suspending fluid is sprayed from a upper sprayer/spray manifold 42 while the produce-washing liquid is sprayed from a lower spray manifold 44. The suspending fluid (preferably air) further retards the downward motion of the freshly-cut produce 30 and increases the tumbling motion of the produce 30 so that the produce 30 is more thoroughly exposed to the direct produce-washing liquid spray 32.

In operation, one or more inflight wash systems 20, 40 may be arranged in series to effectively ensure that the produce is thoroughly cleansed. Further, the inflight washing systems 20, 40 may be used either alone or in combination with other more conventional spraying or flume washing systems—as required for the needs of a particular user/application.

For the foregoing reasons, it is clear that the method and apparatus described herein provides an innovative system for cleaning produce. The current system may be modified in multiple ways and applied in various technological applications. The disclosed method and apparatus may be modified and customized as required by a specific operation or application, and the individual components may be modified and defined, as required, to achieve the desired result. Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A produce cleaning system comprising a feeder system positioned above a produce-washing liquid sprayer wherein, as the produce falls through the air from the feeder system, the produce-washing liquid sprayer directs a spray of produce-washing liquid upward through the air, so that as the produce-washing liquid directly sprays and impacts the falling produce, the produce tumbles through the air and descent of the produce is slowed, and consequently the produce is thoroughly coated and cleaned by the produce-washing-liquid, and a suspending fluid sprayer, the suspending fluid sprayer being positioned below the feeder system so that as a suspending fluid directly impacts the falling produce, the descent of the falling produce is further slowed, wherein the suspending fluid is gas.

2. The system of claim 1, wherein the suspending fluid comprises air.

3. The system of claim 1, wherein the produce-washing liquid comprises a liquid solution of chlorine or other sanitizer.

4. The system of claim 1, wherein the produce comprises fresh-cut produce.

5. The system of claim 1, wherein the produce comprises freshly-cut produce.

6. The system of claim 1, wherein the system further comprises a substrate positioned so that cleaned the produce ultimately lands on the substrate and the liquid drains away from the substrate.

7. The system of claim 1, wherein the suspending fluid sprayer sprays the suspending fluid from a spray manifold positioned in a produce chute.

8. The system of claim 7, wherein the suspending fluid spray manifold comprises apertures that spray the suspending fluid with an upward velocity component.

9. The system of claim 1, wherein the produce-washing liquid sprayer directly sprays the produce-washing liquid from a spray manifold, the spray manifold being positioned in a produce chute.

10. The system of claim 9, wherein the manifold comprises nozzles that spray the produce-cleaning fluid with an upward velocity component.

11. The system of claim 9, wherein the manifold system extends horizontally and is concentric to walls of the chute.

12. The system of claim 1, wherein the system further comprises a produce chute positioned so that the airborne produce falls into the chute.

13. The system of claim 12, wherein the produce chute has a hollow, truncated and inverted cone shape.

14. The system of claim 12, wherein the produce chute has a round cross section so that produce is funneled downwardly.

* * * * *